United States Patent [19]
Kotaki et al.

[11] Patent Number: 4,821,011
[45] Date of Patent: Apr. 11, 1989

[54] PRESSURE SENSOR

[75] Inventors: Mitsuko Kotaki, Chiryu; Ryohei Yabuno; Masami Ishii, both of Toyota, all of Japan

[73] Assignee: Aisin Seiki Kabushiki Kaisha, Kariya, Japan

[21] Appl. No.: 29,646

[22] Filed: Mar. 24, 1987

[30] Foreign Application Priority Data

Mar. 24, 1986 [JP] Japan .................. 61-065464

[51] Int. Cl.$^4$ .............................. G01L 1/22
[52] U.S. Cl. .......................... 338/4; 338/36; 338/42; 338/3; 338/5
[58] Field of Search ............ 338/36, 42, 2, 3, 4, 338/5

[56] References Cited

U.S. PATENT DOCUMENTS 3,761,958  9/1973  Nishira ...................... 338/36
4,327,350  4/1982  Erichsen ..................... 338/4

FOREIGN PATENT DOCUMENTS 59-132327  7/1984  Japan .
60-174844  9/1985  Japan .

Primary Examiner—E. A. Goldberg
Assistant Examiner—M. M. Lateef
Attorney, Agent, or Firm—Oblon, Fisher, Spivak, McClelland & Maier

[57] ABSTRACT

A pressure sensor in which a Ni-Si-B amorphous alloy strain gauge is covered and protected from the external impact and dust in the air by a protective film.

3 Claims, 2 Drawing Sheets

PRESSURE SENSOR

BACKGROUND OF THE INVENTION

1. Field of the Invention

The present invention relates to a pressure sensor with a strain gauge of an amorphous alloy formed on a diaphragm.

2. Description of the Prior Art

A pressure sensor with a strain gauge formed on a diaphragm, measures pressure by the strain gauge which detects a stress variation caused by the difference in the pressures applied to the both sides of the diaphragm.

Meanwhile, as disclosed in the Japanese Examined and Published Patent Applications Nos. SHOWA59-132327, following sensors are known as conventional strain gauge type pressure sensors:

a sensor in which a strain gauge is bonded to the surface of a metallic diaphragm by an adhesive; a sensor in which a metallic film as a strain gauge is formed on the surface of a ceramic diaphragm such as a glass plate by sputtering; a sensor in which an inorganic insulating film is formed on the surface of a metallic diaphragm such as a stainless plate and phosphorus bronze plate by the method of vacuum film forming such as sputtering, ionplating, vacuum evaporating and CVD method, and a metallic film is formed as a strain gauge on the inorganic insulating film by the above-mentioned method such as the sputtering and so on.

As an inorganic insulating film, for example, a film of silicon dioxide or silicon nitrogen or aluminum oxide is used and the preferred thickness of the film is approximately from 1.0 to 2 $\mu$m. On the other hand, as a metallic film, an amorphous metal having a low resistance temperature coefficient, such as Ni-Si-B amorphous alloy is used and the preferred thickness of the film is approximately from 0.1 to 2.0 $\mu$m. This metallic film is formed into a pattern having thin linear portions by photo-etching so that a strain gauge is produced on the diaphragm.

The diaphragm with above inorganic insulating film and strain gauge, is stored inside a housing and set there in order to part a space of the housing into two rooms, one is the room affected by the standard internal pressure and the other is the room affected by the atmospheric pressure.

When in measuring, a strain is developed on the diaphragm due to the difference in the pressures applied to the both sides of the diaphragm and a resistance value of the strain gauge is varied by the strain.

As described previously, the conventional pressure sensor employs an amorphous alloy having a low resistance temperature coefficient as a strain gauge. However, the pressure sensor has a following drawback.

When the pressure sensor is exposed to a high temperature, that is, more than 50° C. for many hours, the amorphous alloy strain gauge may react with oxygen in the air and the electrical resistance value of the strain gauge is varied gradually. Then each strain gauge is put into disorder according to the extent of the variation, further the balance of resistances in a bridge is disordered, and finally, the performance of the pressure sensor is deteriorated.

SUMMARY OF THE INVENTION

Accordingly, it is an object of the present invention to provide a pressure sensor with a strain gauge capable of eliminating the above-mentioned problems, more specifically, to provide a pressure sensor having a good durability against the hot air.

The pressure sensor of the present invention comprises a diaphragm, an amorphous metal strain gauge formed on the diaphragm and a protective film composed of silicon oxide formed on the amorphous metal strain gauge by a vacuum film forming method to coat the surface of the amorphous metal strain gauge.

The inventors experimented with a variety of protective films which protect the amorphous metal strain gauge against the hot air. Finally, the inventors discovered a protective film composed of silicon oxide formed by a vacuum film forming method.

The diaphragm of the pressure sensor according to the present invention is the same as that of the conventional pressure sensor. Namely, as the diaphragm, a metallic diaphragm, a semiconductor diaphragm and a ceramic diaphragm can be used. In the case the diaphragm to be used is made of an electric conductive material, the diaphragm should be formed with a well-known insulating film by a vacuum forming method.

As the amorphous metal strain gauge, a NiSiB amorphous alloy, FeCrAl amorphous alloy, NiCrSi amorphous alloy and amorphous silicon can be used. The NiSiB amorphous alloy is described in the specification of Japanese Patent Application No. SHOWA 59-31933. In the case the alloy is shown in the formular of Ni(a)-Si(b)B(c), the preferable ranges of each of the elements Ni, Si and B are the following. The (a), (b) and (c) are the numbers of atomic percent. The relationship of (a), (b) and (c) is as follows: $(a)+(b)+(c)=100$, $60\leq(a)\leq74$, $16.5\leq(b)$ and $26\leq(b)+(c)\leq40$.

The amorphous alloy composed of 65 atomic % of Fe, 20 atomic % of Cr and 15 atomic % of Al is a typical amorphous alloy of FeCrAl and the amorphous alloy composed of 48 weight % of Ni, 47 weight % of Cr and 5 weight % of Si is a typical amorphous alloy of NiCrSi.

At first a thin uniform film of an amorphous alloy may be formed on a surface of a diaphragm by a well known vacuum forming method such as vacuum evaporating, sputtering, ionplating and C.V.D. Then the uniform film may be shaped by a photolithographer to a determined pattern.

The protective film of the pressure sensor of the present invention is composed of silicon oxide. Namely, the protecting film is the film made of silicon dioxide by a vacuum forming method such as sputtering. The thickness of the protective film is preferably more than 0.2 $\mu$m.

The pressure sensor of the present invention has a good durability against a hot air. The variation of bridge balance of the pressure sensor is kept within 0.05% after the pressure sensor is placed in a hot air of 60° C. for 1,000 hours. While, the protective film, which includes silicon dioxide as a principal component, is a solid film so that an amorphous alloy strain gauge is protected from the external impact or dust in the air. Also the protective film is a thin film with uniformity so that the diaphragm is not deformed and therefore the strain gauge is not affected by the protective film.

The protective film can be formed on an amorphous alloy strain gauge without opening a vacuum tank in the vacuum film forming method such as sputtering. Therefore, the amorphous alloy strain gauge and protective film are bonded each other tightly since both films are formed not contacting with the air. Also, the number of steps can be reduced due to the consecutive formation of the components.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
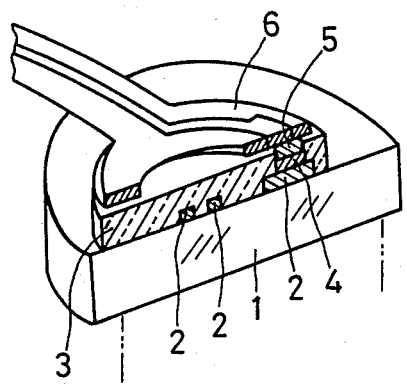
FIG. 1 is a perspective view, partly in cross section, of a pressure sensor in a preferred embodiment according to the present invention.
Figure 2:
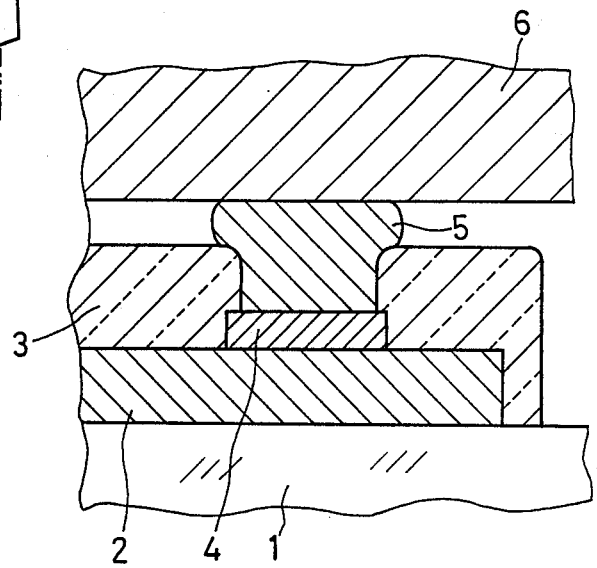
FIG. 2 is an expanded sectional view showing a main portion in FIG. 1.

An embodiment of the pressure sensor of the present invention is shown in FIG. 1 and FIG. 2. FIG. 1 shows a cross section of the pressure sensor and FIG. 2 shows a expanded view of FIG. 1.

The pressure sensor is composed of a diaphragm 1, a strain gauge 2, a film 3, iron electrodes 4, a solder 5 and a flexible printed board 6. The diaphragm 1 is a thin glass of 0.8 mm thickness. The strain gauge is an amorphous NiSiB alloy composed of 66 atomic % of Ni, 23 atomic % of Si and 11 atomic % of B. The thickness of the strain gauge is about 0.4 $\mu$m. The strain gauge 2 was formed on a surface of the diaphragm 1 by sputtering under the following conditions.

Target: NiSiB alloy composed of 69 atomic % of Ni, 19 atomic % of Si and 12 atomic % of B.

Figure 3:
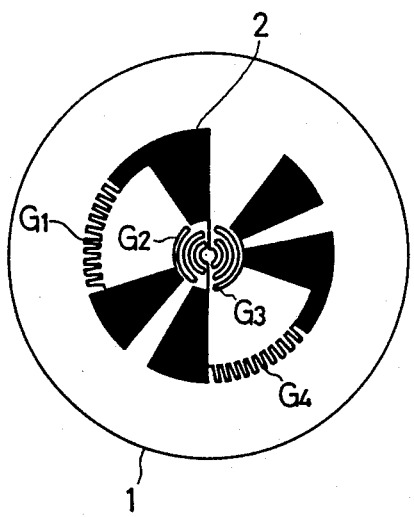
FIG. 3 is a plan view showing of a pattern formed on an alloy film.

Atmosphere: $3 \times 10^{-3}$ Torr of Ar introduced after evacuated up to $2 \times 10^{-5}$ Torr Power: 1.0 kw Forming time: 15 minutes Then, the amorphous film was shaped into the strain gauge 2 by a well-known photo-etching. The shape of the strain gauge is shown in FIG. 3. The four elements, G1, G2, G3 and G4, of the strain gauge 2 had a electric resistance of about 800Ω respectively.

Next iron electrodes 4 were formed by sputtering. The atmosphere was $3 \times 10^{-3}$ Torr of Ar introduced after evacuated up to $2 \times 10^{-5}$ Torr. The high-frequency electric power and the time for forming the electrodes were 0.5 kw and 20 minutes.

The protective film 3 was formed by sputtering on the whole surface except for the portion of the iron electrodes 4. The thickness of the protective film was about 1.0 $\mu$m. The sputtering conditions were followings.

Atmosphere: $3 \times 10^{-3}$ Torr of Ar and $1 \times 10^{-4}$ Torr of $O_2$ introduced after evacuated up to $2 \times 10^{-5}$ Torr.

Power: 0.5 kw

Forming time: 60 minutes

Finally the flexible printed board 6 was bonded to the iron electrodes 4 with solder 5. Thus the pressure sensor of the present invention was manufactured.

Figure 4:
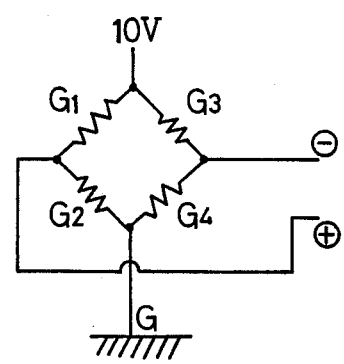
FIG. 4 is a circuit diagram showing a bridge corresponding to the pattern of FIG. 3.

In order to test the durability of the pressure sensor of this embodiment, the pressure sensor was electrically connected as shown in FIG. 4 and was placed in a hot chamber of 60° C. The pressure sensor was charged with 10 volt and the diaphragm was heated at about 80° C. by the current which passes through the gauge. The test result is shown as the line A in FIG. 5 illustrating of the relationship between bridge balance (%) and time (hrs.).

Compared with the protective film of silicon oxide of this embodiment, three kinds of pressure sensors (B), (C) and (D) were prepared. The pressure sensors (B), (C) and (D) are the same as the pressure sensor of this embodiment except their protective films. The pressure sensor (B) has a protective film of a thermosetting resin sold with the registered trade mark "LOCK TIGHT." The pressure sensor (C) has a protective film of another thermosetting resin sold with the name of HARD COAT by SHINETSU KAGAKU CO. The pressure sensor (D) has no protective film. These three pressure sensors were tested in the same manner as the pressure sensor of this embodiment. The test results of the pressure sensors (B), (C) and (D) are shown respectively as lines (B), (C) and (D) in FIG. 5.

Figure 5:
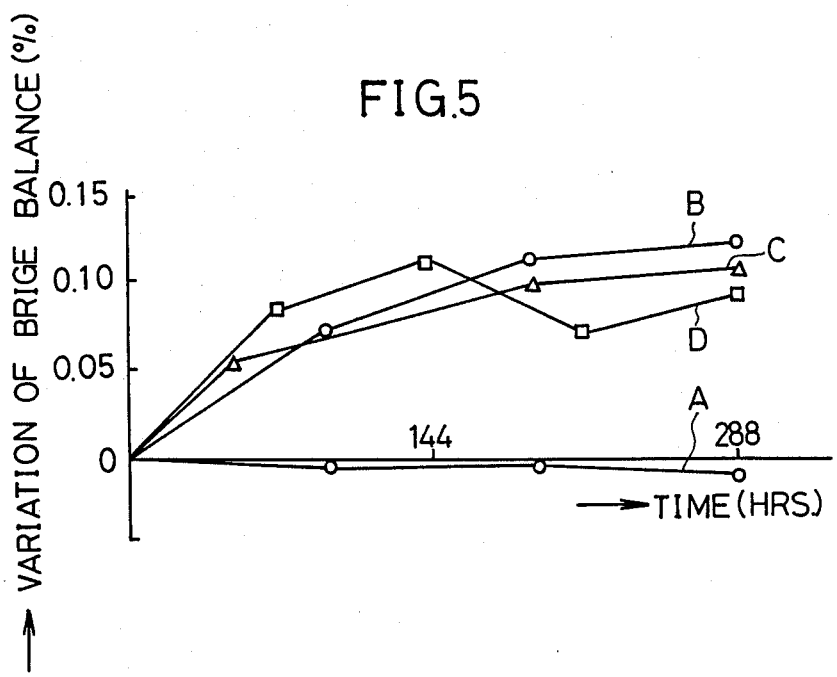
FIG. 5 is a graph showing the relationship between the of bridge balance and time of four sensors, (A), (B), (C) and (D).

Comparing with the test results shown in FIG. 5, the pressure sensor of this embodiment shown as the line (A) remains almost unvarying in spite of time passage.

Figure 6:
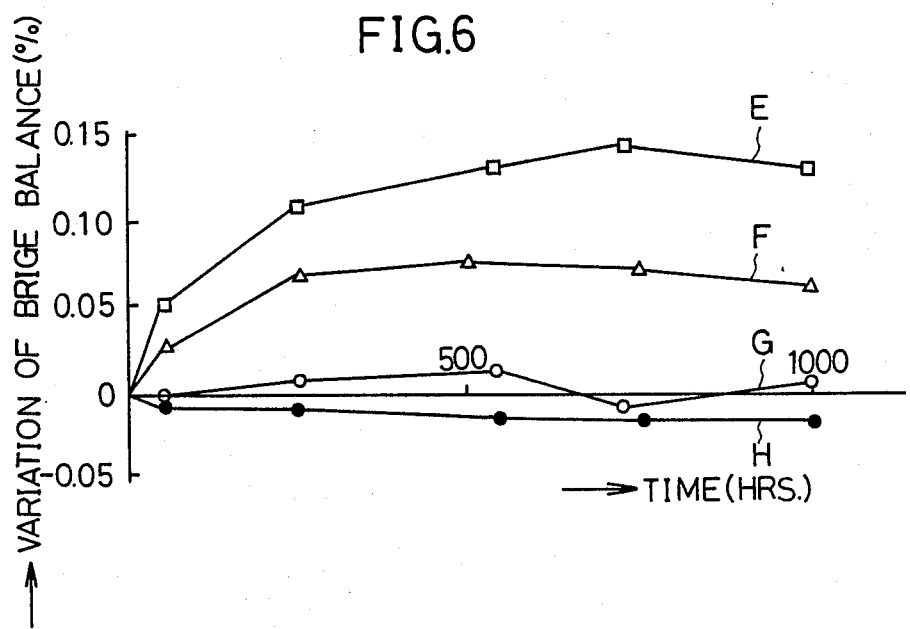
FIG. 6 is a graph showing the relationship between the variation of bridge balance and time of four sensors, (E), (F), (G) and (H).

In the next place, four pressure sensors (E), (F), (G) and (H) were prepared, that is three of them have diaphragms with protective films in different thickness and the rest has a diaphragm without a protective film. The pressure sensor (E) has a diaphragm without a protective film, the pressure sensor (F) has a diaphragm with a protective film of 0.1 $\mu$m thickness comprising silicon dioxide as a principal component, the pressure sensor (G) has the same diaphragm as pressure sensor (F) but of 0.2 $\mu$m thickness and pressure sensor (H) has also the same diaphragm as (F) but of 1.0 $\mu$m thickness. These pressure sensors (E), (F), (G) and (H) were prepared by the same method as the method of the above mentioned embodiment except of the thickness of the protective film of the pressure sensors (F) and (G) and non-existence of the protective film of the pressure sensor (E). These four pressure sensor were tested for 100 hrs. in a hot chamber. FIG. 6 shows the test results as the relationship between the variation of bridge balance and time. In this FIG. 6, the pressure sensors (G) and (H) having sputtered protective films of more than 0.2 $\mu$m thickness and comprising silicon dioxide as a principal component, can restrain the variation of the resistance with a passage of time by protecting the amorphous alloy strain gauge from the air completely.

Meanwhile, twenty thousands times of the performance and endurance test were carried out for two pressure sensors (G) and (H). In this test, air of 1.175 atm and 1 atm were applied alternately to one side of the pressure sensor on which a strain gauge was attached. In the strain gauge, the air was applied to the diaphragm within the area of about 27 mm diameter. This test was repeated twenty thousand times at 3 sec/cycle. No such problems as peeling off and cracking to the surface of the protective film and the variation of bridge resistance were arised on both of pressure sensors (G) and (H).

What is claimed is:

1. A pressure sensor, comprising:
   a diaphragm;
   an insulating film composed of silicon oxide and formed by a vacuum film forming method on said diaphragm;
   an amorphous metal strain gauge formed on said insulating film by a vacuum film forming method;
   electrodes formed on predetermined portions of said amorphous metal strain gauge by a vacuum film coating method; and
   a protective film composed of silicon oxide formed on other portions of said amorphous metal strain gauge not covered by said electrodes.

2. A pressure sensor as claimed in claim 1, wherein said diaphragm is stored in a housing and different pressures are applied to both sides of said diaphragm so that a strain is developed thereon.

3. A pressure sensor as claimed in claim 1 wherein said protective film covers the surface of an amorphous metal including said amorphous metal strain gauge.